L. M. POTTS.
AUTOMATIC SWITCH FOR CONTROLLING MOTOR DRIVEN AUTOMATIC MACHINES.
APPLICATION FILED APR. 9, 1919.
1,403,626.
Patented Jan. 17, 1922.
2 SHEETS—SHEET 1.
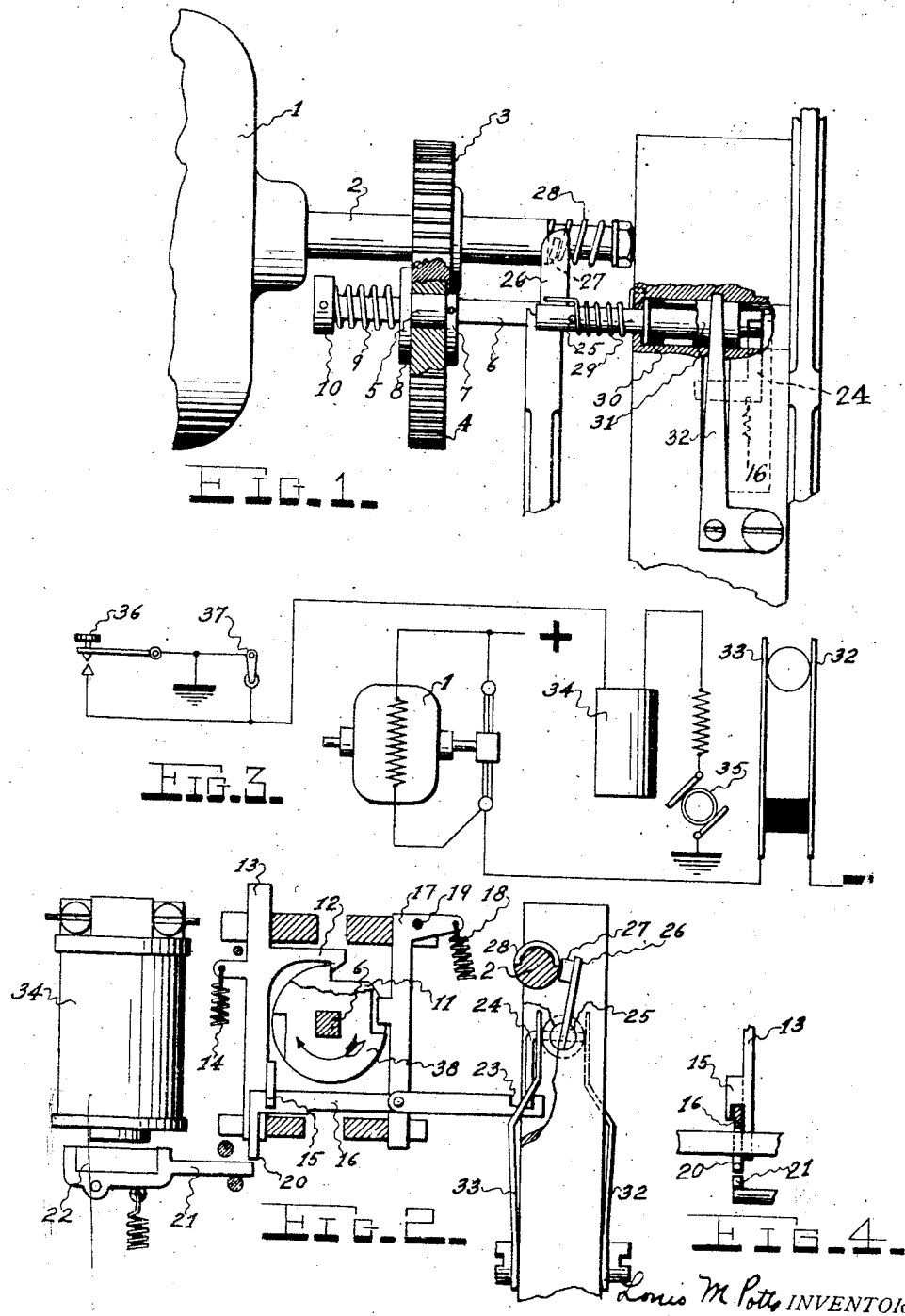

L. M. POTTS.
AUTOMATIC SWITCH FOR CONTROLLING MOTOR DRIVEN AUTOMATIC MACHINES.
APPLICATION FILED APR. 9, 1919.

1,403,626.

Patented Jan. 17, 1922.
2 SHEETS—SHEET 2.

INVENTOR.
Louis M. Potts.

BY
ATTORNEY.

UNITED STATES PATENT OFFICE.

LOUIS M. POTTS, OF BALTIMORE, MARYLAND, ASSIGNOR, BY MESNE ASSIGNMENTS, TO AMERICAN TELEPHONE AND TELEGRAPH COMPANY, OF NEW YORK, N. Y., A CORPORATION OF NEW YORK.

AUTOMATIC SWITCH FOR CONTROLLING MOTOR-DRIVEN AUTOMATIC MACHINES.

1,403,626.         Specification of Letters Patent.    Patented Jan. 17, 1922.

Application filed April 9, 1919. Serial No. 288,841.

*To all whom it may concern:*

Be it known that LOUIS M. POTTS, a citizen of the United States, residing at Baltimore, in the State of Maryland, has invented certain new and useful Improvements in Automatic Switches for Controlling Motor-Driven Automatic Machines, of which the following is a specification.

This invention relates to motor control mechanisms, and more particularly it relates to means for automatically starting and stopping the motor drive of automatic machines such as printing telegraph receivers and transmitters, automatic typewriters, adding machines, and similar devices where, during normal operation, it is desired that the motor should be operating continuously, this application being a continuation in part of an application for Letters Patent of the United States filed December 14, 1915, Serial No. 66,830.

It is the object of this invention to provide automatic means to insure that the motor is not kept running when the machine is not in use.

The invention is specifically illustrated as applied to the control of the motor drive of a printing telegraph machine, and to attain the object above noted, provides a main control magnet such as the main line magnet, which during the period of inoperation is maintained energized by the closure of the line circuit. Through a system of levers cooperating with the armature of the line magnet when the latter is energized, a traveling shoe is brought into engagement with a worm carried by the motor shaft, which shoe, after a predetermined degree of rotation of the motor shaft, operates to interrupt the current supply of the motor. When the machine is again to be put into operation, an opening of the circuit of the control magnet allows this traveling shoe to be disengaged from the worm and returned to its initial position under the influence of a spring or other suitable mechanism, thereby closing the motor circuit.

Figure 5:
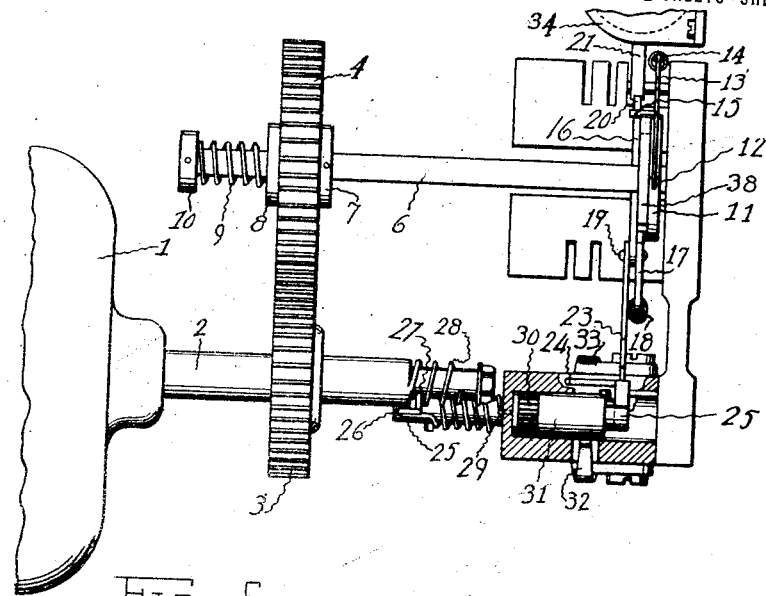
Figure 6:
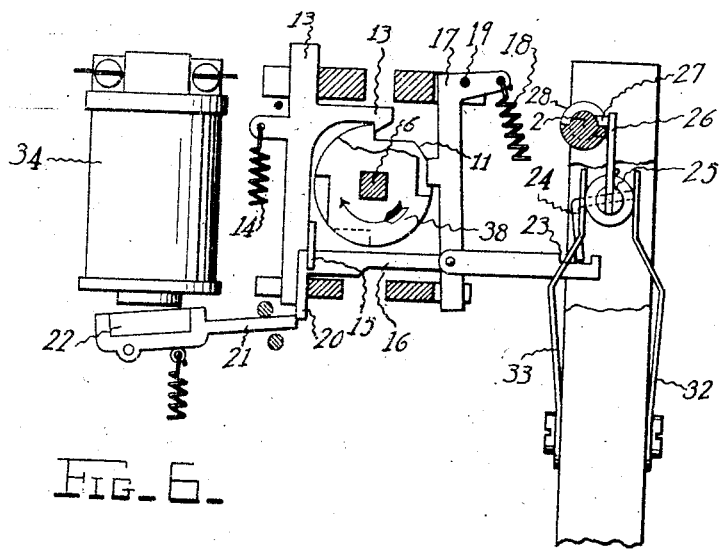

The invention will be more clearly understood by reference to the accompanying drawing in which Fig. 1 is a fragmentary view of the driving mechanism of such machine; Fig. 2 shows the relation of the control magnet and the levers for controlling the circuit of the motor; Fig. 3 is a schematic diagram of the circuit connections; Fig. 4 is a detail view of a portion of the apparatus shown in Fig. 2; Fig. 5 is a plan view showing the interrelation of the driving mechanism and the switch control mechanism; and Fig. 6 is a view showing the position of the mechanism of Fig. 2 when the circuit of the control magnet is closed and the motor is stopped.

In Figure 1, 1 is an electric motor. Shaft 2 of motor 1 carries a gear 3 which meshes with a gear 4 mounted on a round sleeve 5 for rotation independent of sleeve 5. Sleeve 5 is carried on square shaft 6. Mounted rigidly on shaft 6 is a washer 7. On the opposite side of gear 4 is another washer 8 which receives tension of a spring 9, the other end of which presses against washer 10 fast to the end of shaft 6. The pressure created by spring 9 between gear 4 and discs 7 and 8 causes shaft 6 to have a tendency to rotate whenever gear 4 is rotated by motor 1. Shaft 6, however, (see Figure 2) has mounted thereon a notched disc 11. A hook 12 on slide 13 is adapted to engage notches in disc 11 under tension of spring 14, and thereby prevent shaft 6 from rotating even when gear 4 is rotating. Lip 15 on slide 13 extends over one end of arm 16, which is in turn pivoted to arm 17, arm 17 is under tension of a spring 18 which tends to rotate arm 17 about pivot 19 and carry arm 16 to the left, so that tip 20 will be over the end of arm 21 on armature 22. Arm 17 is permitted to move tip 20 to the left only when shaft 6 is stopped by hook 12. Arm 16 has on one end a notch 23 which is engaged by an arm 24, fast to a shaft 25. Shaft 25 carries another arm 26, having a projection 27, adapted to engage the thread of a screw 28 on shaft 2. Projection 27 will be permitted, under tension of spring 29, to engage thread 28 only when arm 16 is to the extreme right. At other times it will be held out of engagement. Shaft 25 carries an insulating sleeve 30, which in turn carries a metal ring 31. Pressing on opposite sides of ring 31 are two contact springs 32 and 33.

Reference will now be had to the electrical diagram, Figure 3. A magnet 34 is adapted to operate armature 22. Magnet 34 is connected in a circuit including a source of direct current 35, a key 36 and a switch 37 in parallel with key 36. Contact spring 32 is connected to negative and contact spring 33 is connected to one terminal of motor 1, the other terminal of which is connected to positive. The circuit may be a telegraph circuit or could be a local operating circuit in an automatic mechanism other than telegraph. Assuming that the motor has been started in the manner to be described hereinafter, the control apparatus will be in the position shown in Fig. 2 and ready for the reception of telegraphic signals, as described in application Serial No. 66830 above referred to. If magnet 34 is now energized motion will be communicated through arm 21, arm 16, slide 13, to hook 12, and shaft 6 will be allowed to rotate, and as soon as magnet 34 is deenergized shaft 6 will be stopped by hook 12 engaging a notch in disc 11. Whenever shaft 6 rotates it will be noted that a cam 38 on shaft 6, will move arm 17 to the right which in turn will move arm 16 and allow shaft 25 to rotate under tension of spring 29 until projection 27 engages thread 28, since shaft 2 is rotating shaft 25 will be moved to the right and along with it metal sleeve 31. If, however, magnet 34 is deenergized shaft 6 will come to rest, arm 16 will move to the left and disengage projection 27 from thread 28 and allow shaft 25 and along with it sleeve 31 to move to the left under tension of spring 29. It will be noted then that if key 36 is opened and closed, as for example, for the purpose of sending code signals, sleeve 31 will be moved to the right after each revolution of the shaft, but will not move far enough, before being allowed to return, for sleeve 31 to move from under contact springs 32 and 33.

If magnet 34 remains energized for a considerable time, as when the line circuit is finally closed at the end of a telegraphic message, the projection or shoe 27 will be brought into engagement with the worm 28, as described above, and will remain in engagement therewith until the conducting sleeve 31 has been moved to the right (Fig. 5) far enough to pass beyond the springs 32, 33, which will then rest on the insulating band 30. The circuit of the motor 1 is thus broken and the motor stops. The control mechanism is then in the position shown in Fig. 6.

When the apparatus is again to be put into operation, a deenergization of magnet 34 caused for example by a preliminary opening of the line circuit, allows armature 22 to fall off, thus permitting slide 16 to move back to the position shown in Fig. 2 under the influence of spring 18. By this movement shaft 25 is rotated to lift shoe 27 clear of the worm 28, and sleeve 31 snaps to the left under the influence of spring 29 and completes the circuit between springs 32 and 33, thus starting the motor.

I claim:

1. In combination with a machine shaft, an electric motor adapted to drive the same continuously, a member adapted to be intermittently driven by said continuously operating shaft, a magnet to control the starting of said intermittently operating member, a switch in the circuit of said motor, and means controlled by said magnet to open said switch dependent upon the length of time said magnet is energized.

2. In combination with a machine shaft, an electric motor adapted to drive the same continuously, a member adapted to be intermittently driven by said continuously operating shaft, a magnet, means controlled by the energizing of said magnet to control the starting of said intermittently operating member, a switch in the circuit of said motor, and means controlled by the deenergizing of said magnet to close said switch.

3. In a machine, an electric motor, a worm driven continuously by said motor, a switch in the circuit of said motor, an arm adapted to engage said worm, a member intermittently driven by said motor, means operated by said intermittently driven member to control the engagement of said arm with said worm, and means controlled by said arm to operate said switch.

In testimony whereof I affix my signature.

LOUIS M. POTTS.